United States Patent [19]
Mathews

[11] 3,748,876
[45] July 31, 1973

[54] BIKE SECURITY DEVICE
[76] Inventor: Thomas R. Mathews, 2029 H St., Sacramento, Calif. 95814
[22] Filed: Nov. 8, 1971
[21] Appl. No.: 196,513

[52] U.S. Cl. .................................... 70/18, 70/227
[51] Int. Cl. ............................................ E05b 73/00
[58] Field of Search .....70/14–15, 18, 30, 49, 57–62, 225–227, 233–234

[56] References Cited
UNITED STATES PATENTS
1,305,563  6/1919  Poland ................................... 70/226
1,354,172  9/1920  Courtney ............................ 70/18 X
FOREIGN PATENTS OR APPLICATIONS
164,986  6/1921  Great Britain ......................... 70/233

*Primary Examiner*—Robert L. Wolfe
*Attorney*—Robert G. West et al.

[57] ABSTRACT

A first elongated rod of hardened metal comprises a first link which spans both wheels of a bike and can also encompass, if desired, a sturdy post, or the like, against which the bike is leaned for support. A second link member comprises another rod which is shorter than the first and is articulated to one end of the first link. A third link member, preferably comprising two or more articulated link portions, is articulated to the other end of the first rod. The second and third link members are joined together at their free ends by lock means on the side of the bike opposite to that occupied by the first link. The three rods not only lock the wheels but also pass through the triangular frame member formed by the seat tube, the seat stays and the chain stays and thereby secure the wheels to the frame.

1 Claim, 4 Drawing Figures

PATENTED JUL 31 1973     3,748,876

INVENTOR.
THOMAS R. MATHEWS
BY
*Lothrop & West*

BIKE SECURITY DEVICE

The invention relates to improvements in devices for protecting bicycles motorcycles, motor scooters, trail bikes and other motorbikes, all collectively termed bikes, against theft.

Owing to a variety of reasons, including the desire for recreation and exercise, bikes continue to be popular among all age groups. Many commuters, for example, find bikes to be a very satisfactory alternative to driving an automobile to work, with the attendant high cost of automobile insurance, parking and maintenance.

A constant worry, however, is the widespread theft of bikes, particularly of the light, speedy, and relatively costly, multiple-speed type of bicycle.

Traditionally, a chain looped through the wheel spokes and around a sturdy post, rail, or the like, served adequately against theft.

At the present time, however, many of the most expensive bicycles, some of which are used for racing or for long distance trips, are provided with wheels which are readily removable from the bicycle. Thus, if only one wheel were chained to a post, the wheel could be removed and left in place while the rest of the bike could be carried away. Furthermore, modern bike thieves carry heavy-duty bolt cutters which can readily shear the customary chain. As a result, chains have been getting not only heavier but also more costly in order to provide links capable of resisting bolt cutters. It is therefore an object of the invention to provide a bike security device which is relatively light and compact, yet affords a high degree of protection against theft. It is another object of the invention to provide a bike security device which is relatively inexpensive and is easy to install and remove.

It is a further object of the invention to provide a bike security device which can readily be folded and carried on the bike itself when the device is not in use.

It is yet a further object of the invention to provide a security device which can be used to advantage not only on a bicycle or tricycle, but also on related wheeled devices such as motorcycles, motor scooters, trail bikes, and the like.

It is another object of the invention to provide a generally improved bike security device.

Other objects, together with the foregoing, are attained in the embodiment described in the following description and shown in the accompanying drawing, in which.

While the bike security device of the invention is susceptible of numerous different physical embodiments, depending upon the environment and requirements of use, substantial numbers of the herein shown and described embodiments have been made, tested and used, and all have performed in an eminently satisfactory manner.

Figure 1:
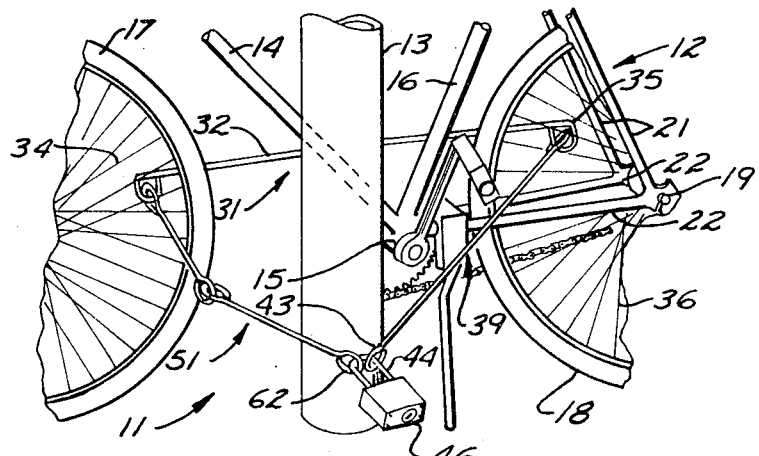
FIG. 1 is a fragmentary perspective view, showing one form of the device installed on a bicycle leaned against a post.
Figure 4:
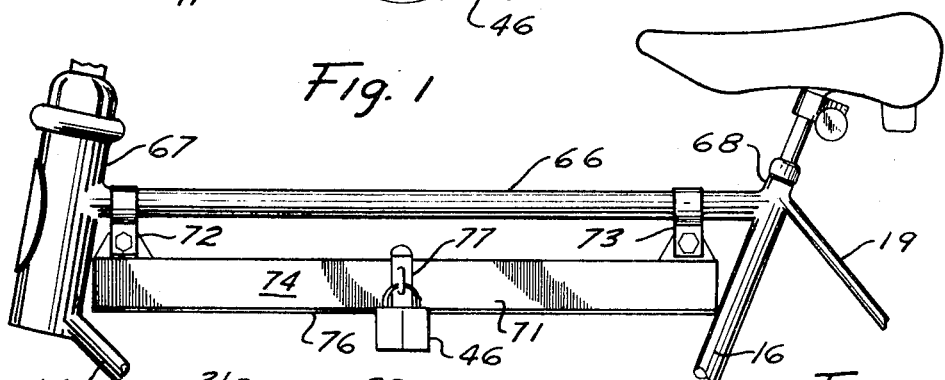
FIG. 4 is a fragmentary side elevational view, to an enlarged scale, showing a type of container mounted on the bike and capable of storing the device in a locked compartment when the device is not in use.

The bike protective device of the invention, generally designated by the reference numeral 11, is, in the example shown in FIG. 1, utilized in conjunction with a bicycle 12 leaned against a sturdy post 13.

For clarity in FIG. 1, there is shown as a part of the frame rearwardly and downwardly inclined member 14, termed a down tube, terminating at the bottom bracket 15, and the rearwardly and upwardly inclined member 16, called a seat tube, it being understood, however, that the front wheel 17 is rotatably mounted on the customary front forks (not shown) and the rear wheel 18 is rotatably mounted between a pair of brackets 19 supported on the after ends of the conventional seat stays 21 and chain stays 22.

In order to secure the wheels to each other and to the post, and to lock the bike frame to the post, as well, I have provided a generally triangular structure comprising a first link member 31, including an elongated bar 32, or rod, preferably of very tough metal, such as case-hardened, alloy steel, capable of affording great resistance to shear, such as by a bolt-cutter.

The bar 32 is long enough so that it spans both wheels, as shown, and its central portion 33 is somewhat bowed so that the bar does not interfere with the down tube 14 and seat tube 16 and will also clear the post 13.

At both ends, the bar 32 is bent and recurved upon itself to form a pair of closed loops 34 and 35. The loops 34 and 35 are elongated in a direction substantially normal to the main body of the bar 32 and face away from the bow 33 so that the loops can be inserted through the spokes 36 of the wheels from the nether side of the bike (see FIG. 1) and project through and slightly beyond the spokes in a direction toward the viewer, thereby affording freedom of movement in adjusting, installing and removing the device.

Articulated to the first link member 31 by interengagement between one of the loops, such as the loop 35, and a ring 37 formed on one end of a bar 38, is a second link member 39.

The bar 38 of the second link member 39 is shorter in length than the first link member 31 but, like the first link member, preferably includes a central bow 41 to assist in maneuvering the device.

The free end of the second link member 39 includes a ring 43 for engagement with a shackle 44 on a lock 46, preferably a key-type lock. The shackle 44 is of hardened medal, at least equal in strength to the hardened bars of the security device structure.

It will be noted that the first and second link members not only lock the rear wheel to the post but they also secure the frame triangle formed by the seat tube 16, the seat stays 21 and the chain stays 22.

Connecting the lock shackle 44 and the loop 34 of the first link member 31 is a third link member 51 preferably comprising at least two portions 52 and 53. Each portion is substantially similar to the other and includes respective hardened metal rods 56 and 57, terminating, respectively, in a pair of eyes 58 and 59 and 61 and 62. As appears most clearly in FIGS. 1 and 2, the portions 52 and 53 of the third link member 51 are articulated to each other and to the first link member 31.

By providing a plurality of articulated links to form the third link member 51, additional flexibility and maneuverability is afforded. In fact, a chain link type of structure could, conceivably, be utilized as the third link member 51. However, as will be realized, the bar type structure shown and described herein is to be preferred since weight for weight it is inherently capable of providing greater strength than the chain type.

A chain link, in other words, comprises, in effect, two parallel bars curved and joined at each end to form a half ring. A rod link, on the other hand, can combine the strength of the two parallel bars of the chain link into one rod. A chain link is no stronger than the strength of only one of its parallel bars. A rod link bar, however, can be made much stronger without having to be twice as heavy, per unit length, as a single chain link bar.

Installation of the device is effected by leaning the bike against the post and inserting the second and third link members through the respective wheel spokes and locking the ends together.

Figure 2:
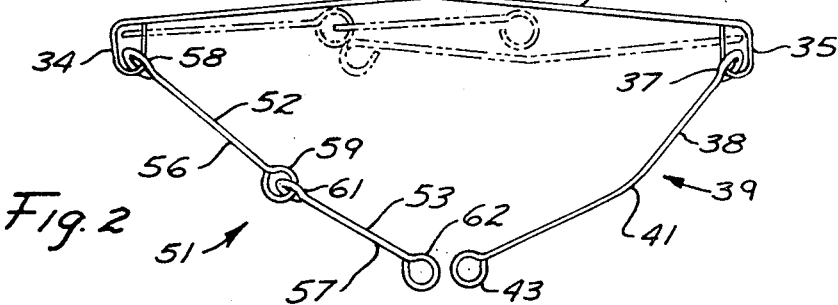
FIG. 2 is a top plan view, to an enlarged scale, of the form of device shown in FIG. 1, and showing in broken lines the position of the links when in folded position.

Upon removing the lock 46, withdrawing the second link member 39 through the spokes of the rear wheel and the third link member 51 through the spokes of the front wheel, the device can be folded into the compact condition indicated in broken line in FIG. 2.

At this juncture the folded members can be suitably secured, as by twine, or straps, to the top tube 66 of the bike, extending between the steering head 67 and the seat post socket 68.

Many prefer, however, an elongated container 71 suspended from the top tube 66 by suitable hangers 72 and 73. A side wall 74 of the receptacle 71 is hinged, alongside lower corner 76, to form a door so as to afford access to the interior. A hasp 77 type of closure holds the door closed and the same lock 46 which locks the bike security device itself, is used to lock the container 71.

Figure 3:
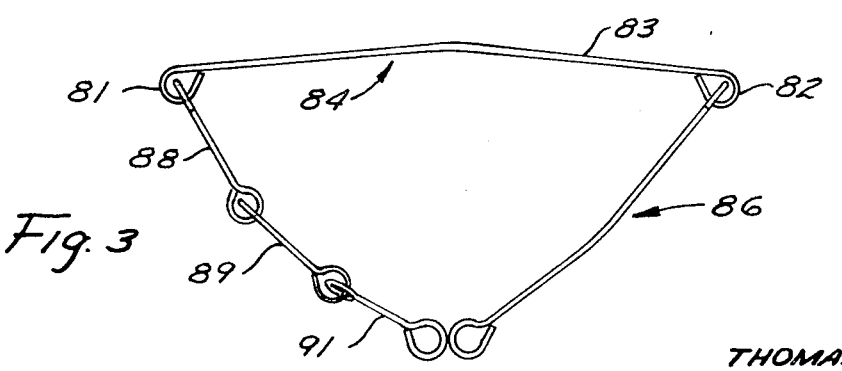
FIG. 3 is a view comparable to FIG. 2, but illustrating a variant form of device.

FIG. 3 illustrated a variant form of device wherein the rings 81 and 82 at the end of the longest bar 83 forming the first link member 84 are more nearly toroidal in shape than the elongated rings 34 and 35 illustrated in FIGS. 1 and 2. The second link member 86 is similar to the second link member 39, but the third link member 87 comprises a plurality of individual link bars 88, 89 and 91, each somewhat shorter than the rods 56 and 57 in FIGS. 1 and 2, and therefore providing an additional degree of flexibility. The FIG. 3 modification, as before, can be folded compactly for storage.

It can therefore be seen that I have provided a bike security device which is tough and versatile in being able to lock a bike to posts of various sizes and shapes, but which can also be folded and securely stored in a compact space.

What is claimed is:

1. A security device for a two wheel bike comprising:
   a. a first link member including a bar of hardened metal having a length sufficient to span the distance between the adjacent rim portions of both wheels of the bike, said first bar having at opposite ends a pair of loops, both of said loops extending in a direction away from said bar such as to protrude at least partially through the spokes of both wheels with said bar aligned so as to span the wheels;
   b. a second link member including at least one substantially linear bar of hardened metal, said second link member having at opposite ends a pair of rings, said first link member being linked with said second link member by engagement between one of said loops and one of said rings;
   c. a third link member including at least one substantially linear bar of hardened metal, said third link member having at opposite ends a pair of eyes, said first link member being linked with said third link member by engagement between the other of said loops and one of said eyes; and,
   d. lock means for releasably connecting said second link member to said third link member by interengagement between said lock means, another of said rings and another of said eyes, the combined lengths of said second link member and said third link member exceeding the distance between said loops by an amount sufficient to encompass the adjacent rim portions of both wheels and a securing post located adjacent the wheels.

* * * * *